UNITED STATES PATENT OFFICE.

ANDREW PETERS, OF BROOKLYN, NEW YORK.

BAKING-POWDER.

SPECIFICATION forming part of Letters Patent No. 331,542, dated December 1, 1885.

Application filed September 5, 1885. Serial No. 176,255. (No specimens.)

*To all whom it may concern:*

Be it known that I, ANDREW PETERS, a citizen of the United States, residing at Brooklyn, in the county of Kings and State of New York, have invented a new and useful Improvement in Baking-Powders, of which the following is a specification.

Heretofore various methods have been tried for producing a phosphate baking-powder which will keep for a considerable length of time. Among these methods may be mentioned desiccating the starch and incorporating phosphoric acid in the starch; but they have not met with much success.

My invention has this object in view; and it consists in the use of a carbonate of an alkaline earth as an essential ingredient of the phosphate baking-powder.

The following are the constituents of the baking-powder as I prefer it, though I do not confine myself to the exact compound which I am about to describe. Each of the constituents about to be named is used in a powdered dry state, (the drier the better,) and they are mixed intimately together in the ordinary manner in which baking-powders have been heretofore prepared.

The constituents which I prefer are as follows: two hundred and thirty-four parts, by weight, acid phosphate of lime; one hundred and sixty-eight parts, by weight, carbonate of magnesia.

While in the state of powder the above ingredients remain unchanged; but when used in baking the liquid which is used in the operation causes the acid phosphate to unite with the magnesia (an alkaline earth) of the carbonate of magnesia, thereby liberating the carbonic-acid gas, which raises the dough.

In making a useful baking-powder it is essential that the union between the ingredients should not take place until the powder is used, because, if it is likely to take place before, when the powder is kept for a considerable length of time before being used the gas-producing properties of the powder may be in a great measure or entirely destroyed by the spontaneous action of the constituents on one another. When the acid phosphate and carbonate of magnesia are in the dry state of the powder, they may remain together for any length of time without serious deterioration. When these ingredients are brought into contact with a liquid, as in the operation of mixing dough, their action is rapid and efficient.

The proportions given might be varied to a considerable extent, and in lieu of the carbonate of magnesia the carbonate of lime or a mixture of a carbonate of an alkaline earth and a carbonate of an alkali might be used. Moreover, any carbonate may be used, as a bicarbonate or a sesquicarbonate.

In case of variation from the ingredients first named, it will be understood that the quantities of the ingredients will be preferably adjusted to correspond with the chemical equivalents of the substances employed.

My improved baking-powder is put up in cans, cases, packages, or bottles in a thoroughly dry state, and is employed by adding it to the flour in about the proportion of about two tea-spoonfuls of baking powder to one quart of flour, one tea-spoonful salt, one-half tea-spoonful sugar, and one and one-half pint milk; but of course some of the above ingredients may be omitted or their proportions be greatly varied with perfectly good results.

Phosphate baking-powders are generally recommended by reason of the healthful effects which the phosphates produce in their use, but have heretofore been objectionable, because the acid phosphate which they contained was liable to act spontaneously upon the other ingredients, and thus prevent the powder from being kept for any great length of time. The presence of the carbonate of an alkaline earth in my powder removes this difficulty, and while preserving the beneficial effects of the phosphate powders, greatly increases their lasting quality.

It will be understood by all familiar with the art that of the four carbonates of alkaline earth—viz., of magnesia, lime, strontia, and baryta—the first three only are available for the purpose of this invention, the last being considered poisonous.

I claim—

A baking-powder consisting in its essential elements of an acid phosphate of lime and a carbonate of lime or magnesia or strontia, substantially as described.

ANDREW PETERS.

Witnesses:
LIVINGSTON GIFFORD,
DANIEL H. DRISCOLL.